(No Model.)

J. BONNER.
INTERCHANGEABLE INITIAL RING.

No. 464,809. Patented Dec. 8, 1891.

WITNESSES:
William J. Miller
Edward Wolff

INVENTOR:
Julius Bonner.
BY
Van Santvoord & Hauff
ATTORNEYS

UNITED STATES PATENT OFFICE.

JULIUS BONNER, OF NEW YORK, N. Y.

INTERCHANGEABLE-INITIAL RING.

SPECIFICATION forming part of Letters Patent No. 464,809, dated December 8, 1891.

Application filed May 14, 1891. Serial No. 392,745. (No model.)

*To all whom it may concern:*

Be it known that I, JULIUS BONNER, a citizen of the United States, residing at New York, in the county and State of New York, have invented new and useful Improvements in Interchangeable-Initial Rings, of which the following is a specification.

This invention relates to that class of rings provided with initials, monogram-letters, or other ornaments held on stones in the ring, said initials, monograms, or ornaments being interchangeable—that is, adapted to be removed from one ring and placed in another.

The peculiar and novel means employed by me for the purpose above stated and forming the subject-matter of my present invention are pointed out in the following specification and claim and illustrated in the accompanying drawings, in which—

Figure 1:
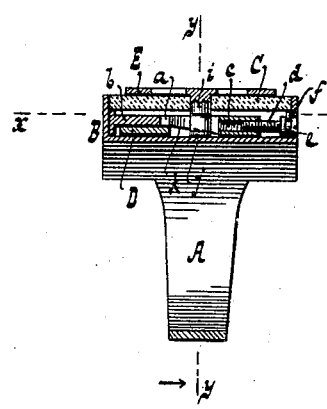
Figure 2:
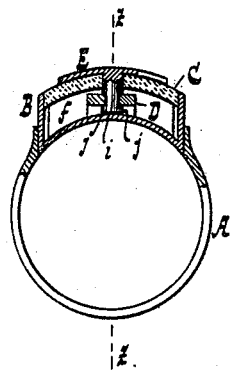
Figure 3:
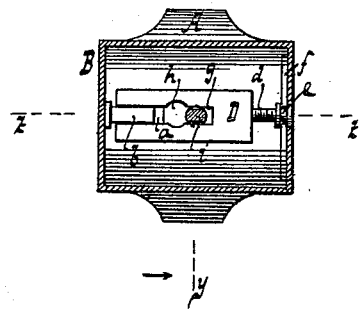
Figure 4:
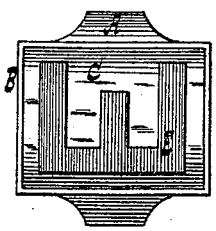
Figure 5:
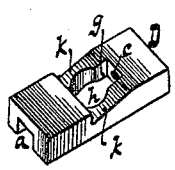

Figure 1 is a section of the ring in the plane $z\,z$, Figs. 2 and 3. Fig. 2 is a section in the plane $y\,y$, Figs. 1 and 3. Fig. 3 is a section in the plane $x\,x$, Fig. 1. Fig. 4 is a face view of the ring. Fig. 5 is a perspective view of the locking-slide in an inverted position.

In the drawings, the letter A designates a ring which is provided with a recess or cavity B for the reception of the stone C. In the interior of this cavity is situated a locking-slide D, which is provided at one end with a recess $a$ to engage a lug $b$, which projects from the inner surface of the cavity B. The opposite end of the locking-slide is provided with a screw-threaded hole $c$ to engage a screw $d$, the head of which is provided with a circular groove $e$ to engage a plate $f$, which is firmly secured to the inner surface of the cavity B. (See Figs. 1 and 3.) By these means the screw $d$ is prevented from moving in the direction of its length, and if said screw is turned the locking-slide D is caused to move backward or forward in the cavity B. In the locking-slide is formed a slot $g$, with an enlargement $h$, which is large enough to admit the shank $i$ of the initial-letter or ornament E, the stone C being provided with a hole through which the shank $i$ can be passed. Above its outer end the shank $i$ is reduced in thickness, Figs. 1, 2, and 3, so as to form shoulders $j$, Fig. 2, and the bottom edges $k$ of the slot $g$ form inclined planes, which engage the shoulders $j$ of the shank whenever the locking-slide is moved so as to bring the shank in engagement with the narrow portion of the slot $g$, Fig. 3.

In order to introduce the shank $i$ into the slot of the locking-slide D, said locking-slide must be adjusted so as to bring the enlargement $h$ of the slot directly beneath the hole in the stone C, and after the shank has been introduced the locking-slide D is moved by the screw $d$ into the position shown in Figs. 1 and 3, so that the inclined edges $k$ of the slot $g$ bear upon the shoulders $j$ of the shank $i$, whereby said shank is drawn inward and the initial-letter or ornament E is firmly locked in position.

I am aware that a ring has been heretofore constructed in which the initial-letters are held in position by means of a key, which engages two pins projecting from the initial-letter through the stone. In rings of this class the initial-letters must be provided with two pins or shanks, and even then the key is not enabled to draw the initial-letter firmly down upon the stone and to hold the same rigidly in position. By means of the locking-slide D and its inclined edges $k$ I am enabled to draw the single shank of the initial-letter or ornament downward, sufficient force being produced by the screw $d$ to lock the initial or ornament firmly in the required position.

What I claim as new, and desire to secure by Letters Patent, is—

The combination, with the ring A, its cavity B, the stone C, and the initial or ornament E, of the locking-slide D, provided with inclined edges $k$, formed to engage shoulders $j$ on the shank $i$ of the initial or ornament E, and a screw $d$ for imparting motion to the locking-slide, substantially as described.

In testimony whereof I have hereunto set my hand in the presence of two subscribing witnesses.

JULIUS BONNER.

Witnesses:
J. VAN SANTVOORD,
E. F. KASTENHUBER.